July 10, 1934.  W. F. EWALD  1,965,632
MEANS FOR MEASURING DISTANCES
Filed Nov. 18, 1930
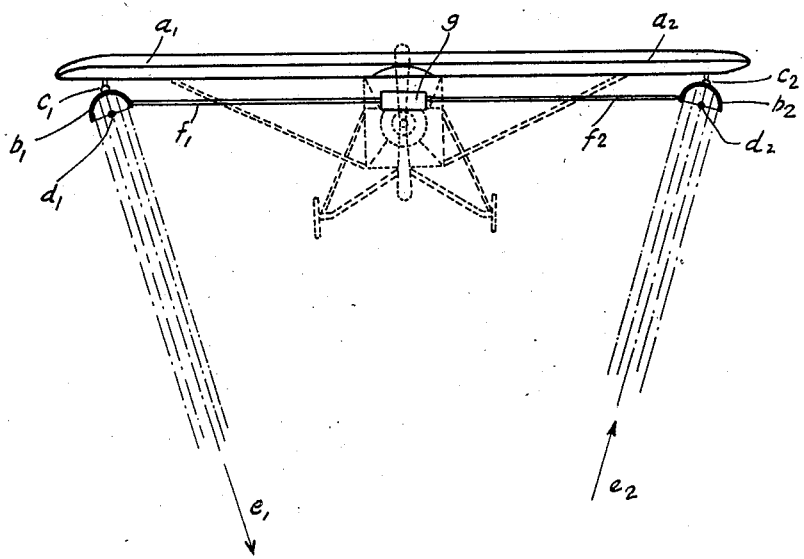
INVENTOR
WOLFGANG F. EWALD
BY
ATTORNEY Patented July 10, 1934

1,965,632

UNITED STATES PATENT OFFICE 1,965,632

MEANS FOR MEASURING DISTANCES

Wolfgang F. Ewald, Berlin, Germany, assignor to Telefunken Gesellschaft fur Drahtlose Telegraphie m. b. H., Berlin, Germany, a corporation of Germany Application November 18, 1930, Serial No. 496,428
In Germany September 23, 1929

2 Claims. (Cl. 250—11)

It is known that short waves, say, of a length of a few centimeters, can be concentrated readily by the aid of a very small oscillation circuit located in the focus of a metallic reflector so that they will be beamed or bunched in one direction. Upon impinging upon another oscillation circuit, also disposed in the focus of a reflector, this second circuit is caused to undergo strong oscillations.

This property of short waves is utilized, according to the present invention, for determining distances, especially of aircraft and marine vessels or similar purposes.

One embodiment of the measuring device according to this invention for ascertaining the altitude of an aircraft above water or land is diagrammatically illustrated in the drawing.

At two points as far apart as possible on the aircraft, for example, at the tips of the supporting wings or surfaces $a_1$, $a_2$ of an airplane, there are mounted two reflectors $b_1$, $b_2$, being disposed so as to pivot about two horizontal axes $c_1$, $c_2$. These reflectors $b_1$ and $b_2$ are arranged exactly parallel to each other, and in the foci thereof are located the oscillation circuits $d_1$, $d_2$ respectively. The oscillation circuits are designed especially for short waves.

The reflectors $b_1$ and $b_2$ are suspended so as to be able to pivot downwards about the axes $c_1$ and $c_2$. If the angular position is conveniently chosen, the beam $e_1$ issued from the sending reflector is reflected at the surface of the earth, and it thus strikes in the form of a reflected oscillation or beam $e_2$ the other reflector $b_1$, termed a receiving reflector.

The angular position of the reflectors then serves as a measure of the distance above ground or a sheet of water of the aircraft.

So as to provide a convenient method of observing distance, as will hereinafter become more apparent, the two reflectors $b_1$ and $b_2$ are inter-connected by tie rods $f_1$, $f_2$ engaging or attached to the two reflectors at points located either above or below their pivot points in axes $c_1$ and $c_2$. The angle formed with the perpendicular inside which the beam leaves the reflector $b_1$ on the airplane depends upon the length of the connecting rod, and this length is regulable by the aid of an adjusting device $g$, which is combined with a scale for reading the distance. The adjusting or setting device $g$ is actuated until a signal is released by the beams or radiations after having been reflected at the surface of the earth and strikes the receiving reflector and its oscillation circuit. The distance of the airplane above ground may then be read directly in terms of length by observing the position of the adjusting device $g$ relative to the scale.

It will be understood that in lieu of the receiving reflector, also a suitable antenna device could be used which is less sensitive to slight discrepancies or deviations from the theoretical direction of incidence of the reflected beam.

In the embodiment hereinbefore described by way of example it has been supposed that the two reflectors are adjustable, though this is not absolutely necessary, for the distance is determinable alone by the angular position of the transmitting reflector or of the receiving reflector in relation to the perpendicular.

Orientating the two parts comprised in the arrangement hereinbefore described in such a way that the beam axes fall approximately in the direction of travel of the craft, and that the pivoting axes are disposed horizontally above each other or vertically adjacent to each other at a sufficiently great distance, or that one reflector with its oscillation circuit is pivotal about a horizontal or vertical axis at right angles to the direction of travel then the same apparatus may be used also for the purpose of determining obstacles such as mountains located in the path of the aircraft, and the distance between them and the craft. It is also useful to ascertain the approach of a travelling craft from a stationary point of observation at night or during a fog, and to measure the distance thereof, or else for the object of determining on marine vessels the approach of other vessels or the location of the coast at night time or in foggy weather in the absence of illumination.

Since the waves having a length of an order as here dealt with are subject to very little absorption when solar radiation is limited, that is, during the night and in fogs, the apparatus here-in disclosed represents a reliable navigation means under circumstances where optical methods and means fail to serve.

Many modifications and changes may suggest themselves to those skilled in the art to which the invention relates, and I, therefore, believe myself to be entitled to make and use any and all of such modifications as fall fairly within the spirit and scope of the hereinafter appended claims.

Having now described my invention, what I claim and desire to secure by Letters Patent is the following:

1. A device to be used on aircraft or other vessels to determine the distance between the same and a wave reflecting object comprising, a pair of spaced supports on said craft, a pair of reflectors pivoted to said supports, said pivots being a pre-determined known distance apart, an ultra-short wave oscillator located in the focus of one of said reflectors, said oscillator producing oscillations which are radiated in a directive manner from said oscillator and reflector, an ultra-short wave receiving device located in the focus of the other of said reflectors, said receiving device being responsive to waves sent out from said first named oscillator and reflector and reflected back from a reflecting object, and connectors between said reflectors for moving the same toward and from each other to vary the angular relation between said reflectors, the length of said connectors between said reflectors being an indication of the angular relation between said reflectors, and therefore an indication of the distance between the oscillator and its reflector and the receiving means and its reflector.

2. A device to be used on aircraft or other vessels to determine the distance between the same and a wave reflecting object comprising, a pair of spaced supports carried by said craft, a reflector pivotally mounted on each of said supports, an oscillator for producing electrical oscillations located in the focus of one of said reflectors, said oscillator and reflector cooperating to send a directive beam of oscillatory energy, a receiving device located in the focus of the other of said reflectors, said receiving device being responsive to oscillatory energy reflected from said reflecting object, a pair of members tying said reflectors together, means for increasing or decreasing the length of said members to thereby change the angular relation between said reflectors, the length of said members being an indication of the angular relation between said reflectors and thereby an indication of the distance between the craft and the reflecting object when maximum response is obtained in the receiving device.

WOLFGANG F. EWALD.